(12) United States Patent
Domey et al.

(10) Patent No.: US 8,142,859 B2
(45) Date of Patent: Mar. 27, 2012

(54) METHOD OF APPLYING A CEMENT MIXTURE TO A HONEYCOMB BODY

(75) Inventors: Jeffrey John Domey, Elmira, NY (US); Luiz Eduardo Ferri, Corning, NY (US); Robert Daniel Parker, Beaver Dams, NY (US); Srinivasa Rao Vaddiraju, Corning, NY (US); Wei Xu, Painted Post, NY (US); William Joseph Zaidel, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 364 days.

(21) Appl. No.: 12/474,829

(22) Filed: May 29, 2009

(65) Prior Publication Data

US 2009/0297765 A1   Dec. 3, 2009

Related U.S. Application Data

(60) Provisional application No. 61/130,519, filed on May 30, 2008.

(51) Int. Cl.
*B05D 1/26* (2006.01)

(52) U.S. Cl. ........ 427/427; 118/410; 118/429; 264/129; 264/333; 427/356; 427/421.1

(58) Field of Classification Search ................. 118/107, 118/206, 300, 301, 304, 308, 320, 321, 406, 118/410, 413, 416, DIG. 11; 264/629, 630, 264/631; 427/356, 421.1, 424, 425, 427, 427/427.3; 425/145, 376.1, 464, 465; 502/439; 239/49, 548, 550, 551
See application file for complete search history.

(56) References Cited

U.S. PATENT DOCUMENTS

| | | | |
|---|---|---|---|
| 3,825,645 A | 7/1974 | Fayet | |
| 3,941,544 A | 3/1976 | Barth | |
| 4,424,761 A | 1/1984 | Thorn et al. | |
| 4,913,084 A * | 4/1990 | Seymour | 118/123 |
| 5,176,925 A | 1/1993 | Weber et al. | |
| 5,516,273 A * | 5/1996 | Delmore et al. | 425/192 R |
| 5,647,908 A | 7/1997 | Hausmann et al. | |
| 6,057,000 A * | 5/2000 | Cai | 427/358 |
| 6,340,123 B1 * | 1/2002 | Lee et al. | 239/552 |
| 6,395,087 B1 | 5/2002 | Jairazbhoy et al. | |
| 6,478,564 B1 | 11/2002 | Tieu et al. | |
| 6,491,510 B1 | 12/2002 | Tieu et al. | |
| 2006/0102070 A1 * | 5/2006 | Noro et al. | 118/100 |

* cited by examiner

*Primary Examiner* — Michael Cleveland
*Assistant Examiner* — Alexander Weddle
(74) *Attorney, Agent, or Firm* — Joseph M. Homa; Matthew J. Mason (57) ABSTRACT

A method of applying a cement mixture to an exposed matrix of intersecting walls of a honeycomb body is disclosed. The method may include the steps of providing an applicator, feeding the cement mixture into applicator, forcing the cement mixture to exit the applicator with a substantially uniform velocity, while depositing the cement mixture on the exposed matrix of the honeycomb body.

6 Claims, 10 Drawing Sheets

METHOD OF APPLYING A CEMENT MIXTURE TO A HONEYCOMB BODY

CROSS-REFERENCE TO RELATED APPLICATIONS

This application claims the benefit of U.S. Provisional Application No. 61/130,519, filed May 30, 2008, the entire disclosure of which is hereby incorporated herein by reference.

FIELD

The present disclosure relates generally to applicators and methods configured to apply a cement mixture, and more particularly, to applicators and methods configured to apply a cement mixture to an exposed matrix of intersecting walls of a honeycomb body.

BACKGROUND

Figure 1:
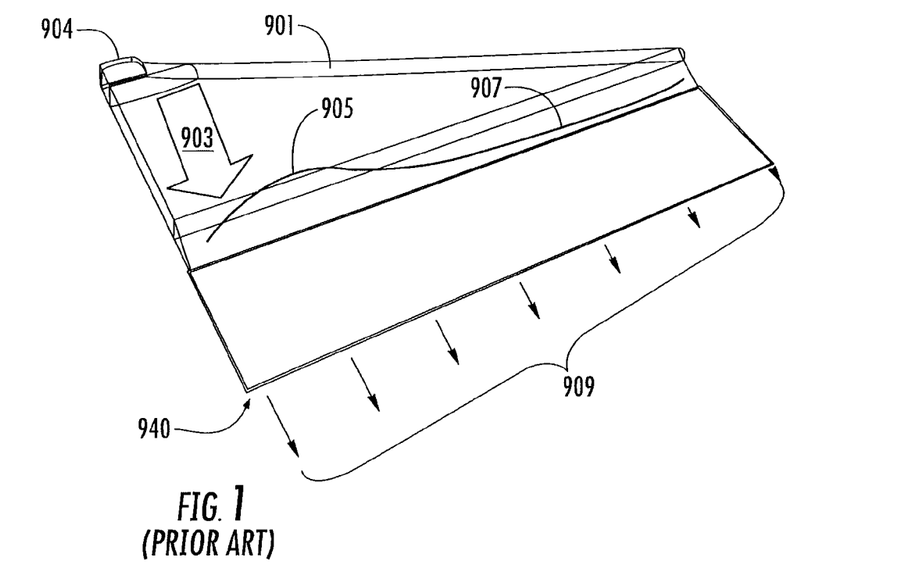
FIG. 1 is a schematic perspective view of a quarter section of an interior area of a conventional applicator.

Conventional methods and apparatus are known to apply a cement mixture to an exposed matrix of intersecting walls of a honeycomb body. FIG. 1 schematically illustrates the interior area 901 of a quarter section of a conventional applicator (not shown) in which a cement mixture flows into the applicator along a pathway 903 from an inlet port 904 to an elongated outlet port 940. The inlet port 904 is typically located near the center of a middle section of the applicator. As a result, a non-uniform delivery of the cement mixture typically results where more cement mixture tends to accumulate in the middle section than the side sections of the applicator. The non-uniform delivery can be represented by line portion 905 indicating a relatively high cement mixture deposit rate at the middle section and line portion 907 and a relatively low cement mixture deposit rate at the side sections of the applicator 901. The non-uniform delivery can also be represented by the velocity profile 909 extending from the middle section to one side section.

Figure 1A:
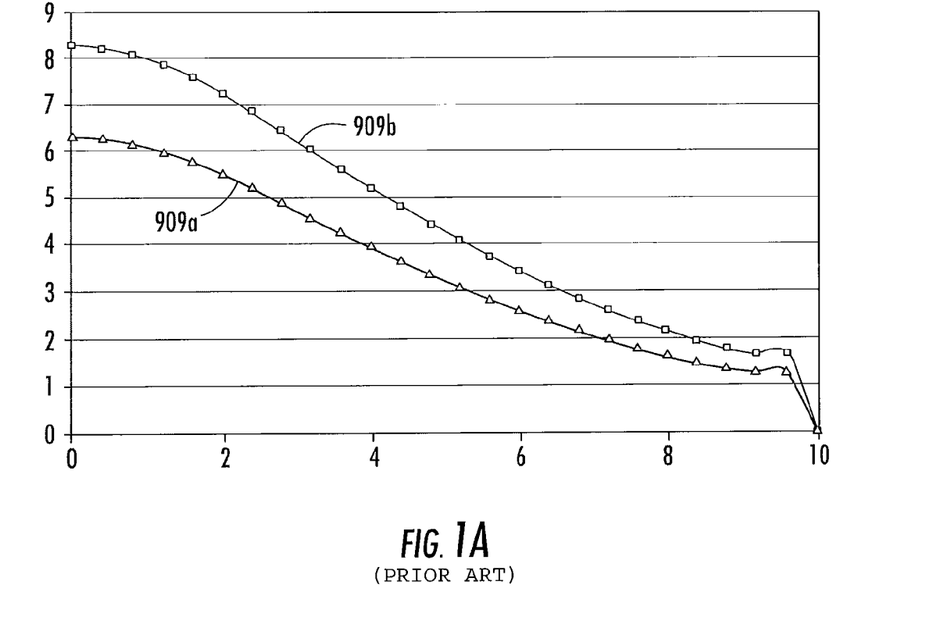
FIG. 1A graphically illustrates the interior area outflow velocity profiles using the conventional applicator of FIG. 1.

FIG. 1A provides a graph illustrating example velocity profiles 909a, 909b of the cement exiting the outlet portion of the conventional applicator. The velocity profile 909a represents a cement flow rate of 15.57 cm$^3$/second (0.95 inch$^3$/second) while velocity profile 909b represents a cement flow rate of 20.48 cm$^3$/second (1.25 inch$^3$/second). The Y-axis represents the velocity, in inches/second, of the cement mixture exiting the elongated outlet port 940. The X-axis represents the distance, in inches, from the center of the middle section to the outer end of one side section. As shown, the total distance between the center of the middle section and the outer end of the illustrated side section is 25.4 cm (10 inches). As FIG. 1 represents a quarter section, it will be appreciated that the overall length "L" of the gap at the illustrated example nozzle exit is 50.8 cm (20 inches) from the outer end of the illustrated side section to the outer end of the other side section (not shown). It will therefore be appreciated that the velocity profiles from the center of the middle section to the outer end of the other side section can be represented by a mirror image of the graph illustrated in FIG. 1A.

Each velocity profile 909a, 909b demonstrates the non-uniform delivery of the cement mixture along the length of the applicator. The non-uniform delivery can require an increased cement mixture flow rate through the inlet port 904 to provide adequate cement mixture delivery at the side sections. Otherwise, undesirable application characteristics may result at the side sections of the applicator. However, increasing the cement mixture flow rate to address deficiencies at the side sections may provide excessive cement mixture delivery at the middle section of the applicator. Such excessive cement mixture delivery may result in undue waste of material. In further examples, the conventional nozzle associated with the applicator may result, for example, in undue waste of material and/or other undesirable application characteristics.

SUMMARY

In accordance with one aspect, a method is disclosed herein for applying a cement mixture to an exposed matrix of intersecting walls of a honeycomb body. The method is conducted with an applicator including a flow distribution device with an inlet port and an elongated outlet port extending along an elongated axis. The method comprises the steps of feeding the cement mixture into the inlet port of the flow distribution device, forcing the cement mixture to exit the elongated outlet port with a substantially uniform velocity profile along the elongated axis, and depositing the cement mixture on the exposed matrix of the honeycomb body.

In accordance with another aspect, an applicator is disclosed herein that is configured to apply a cement mixture to an exposed matrix of intersecting walls of a honeycomb body. The applicator includes a flow distribution device with interior contours at least partially defining an interior area between an inlet port and an elongated outlet port. The interior contours are configured to decrease a resistance to a flow of a cement mixture in a lateral direction from the inlet port along a path located upstream from the elongated outlet port.

In accordance with another aspect of the present invention, an applicator is provided that is configured to apply a cement mixture to an exposed matrix of intersecting walls of a honeycomb body. The applicator includes a flow distribution device with an inlet port and an elongated outlet port extending along an elongated axis. The flow distribution device is configured to distribute a cement mixture between the inlet port and the elongated outlet port to exit the elongated outlet port with a substantially uniform velocity profile along the elongated axis. The applicator also includes a nozzle with an end surface elongated along a length of the nozzle. The end surface includes an elongated outlet port extending along the length of the nozzle and in fluid communication with the elongated outlet port of the flow distribution device. In some embodiments, the end surface includes a transverse width from about 2.54 mm (0.1 inches) to about 5.08 cm (2 inches) along the length of the nozzle.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Figure 7:
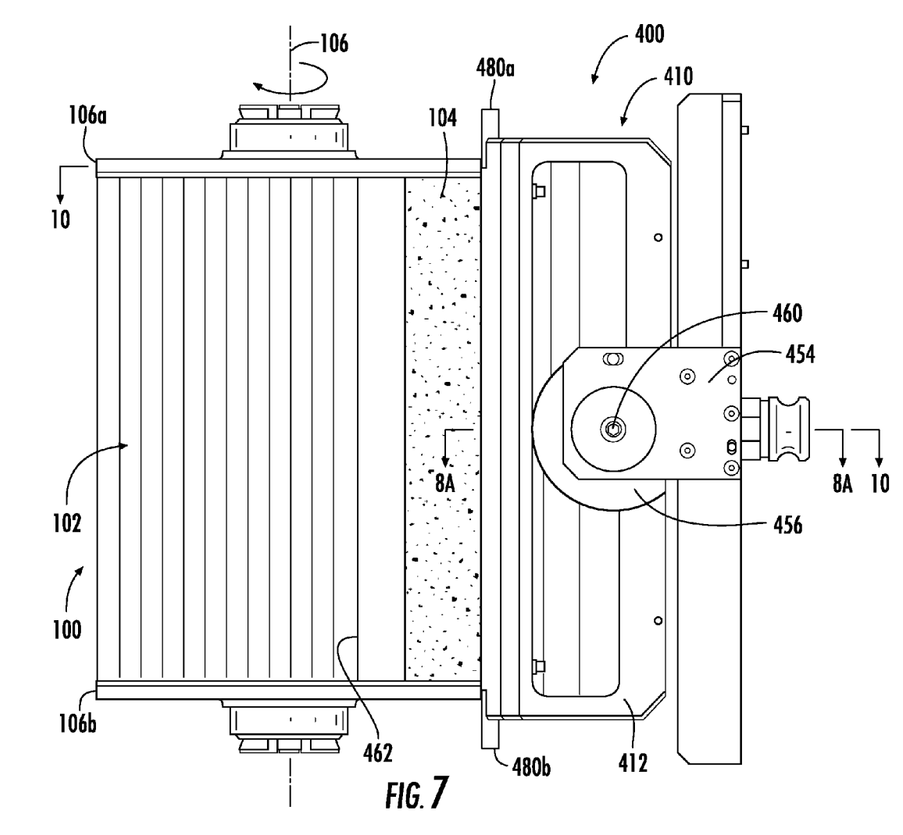
FIG. 7 is an side elevational view of another applicator disposed with respect to a honeycomb body being vertically positioned between a pair of support members.

Applicators are disclosed herein that are configured to apply a cement mixture 104 to an exposed matrix 102 of intersecting walls of a honeycomb body 100 (e.g., FIG. 7). Applicators can be used in a wide variety of environments. For instance, applicators and methods herein may be carried out in accordance with aspects set forth in PCT International Application No. PCT/US2008/002813, filed Feb. 29, 2008 that is herein incorporated by reference in its entirety.

Applicators described throughout the application can be used to apply a wide range of cement mixtures 104. Example cement mixtures can include a paste and/or slurry, such as particles and/or powders mixed with polymer binders and/or low molecular weight liquids and combinations of these and other materials, such as for forming a cement slurry. Descriptions of the materials that may be used for the cement mixture and/or to fabricate the honeycomb body can be found in numerous patents and patent applications. Example ceramic batch material compositions including cordierite are disclosed in U.S. Pat. Nos. 3,885,977; RE 38,888; 6,368,992; 6,319,870; 6,210,626; 5,183,608; 5,258,150; 6,432,856; 6,773,657; 6,864,198; and U.S. Patent Application Publication Nos. 2004/0029707, 2004/0261384, and 2005/0046063. Examples ceramic batch material compositions for forming aluminum titanate are those disclosed in U.S. Pat. Nos. 4,483, 944; 4,855,265; 5,290,739; 6,620,751; 6,942,713; 6,849,181; U.S. Patent Application Publication Nos.: 2004/0020846; 2004/0092381; and in PCT Application Publication Nos. WO 2006/015240; WO 2005/046840; and WO 2004/011386.

Figure 2:
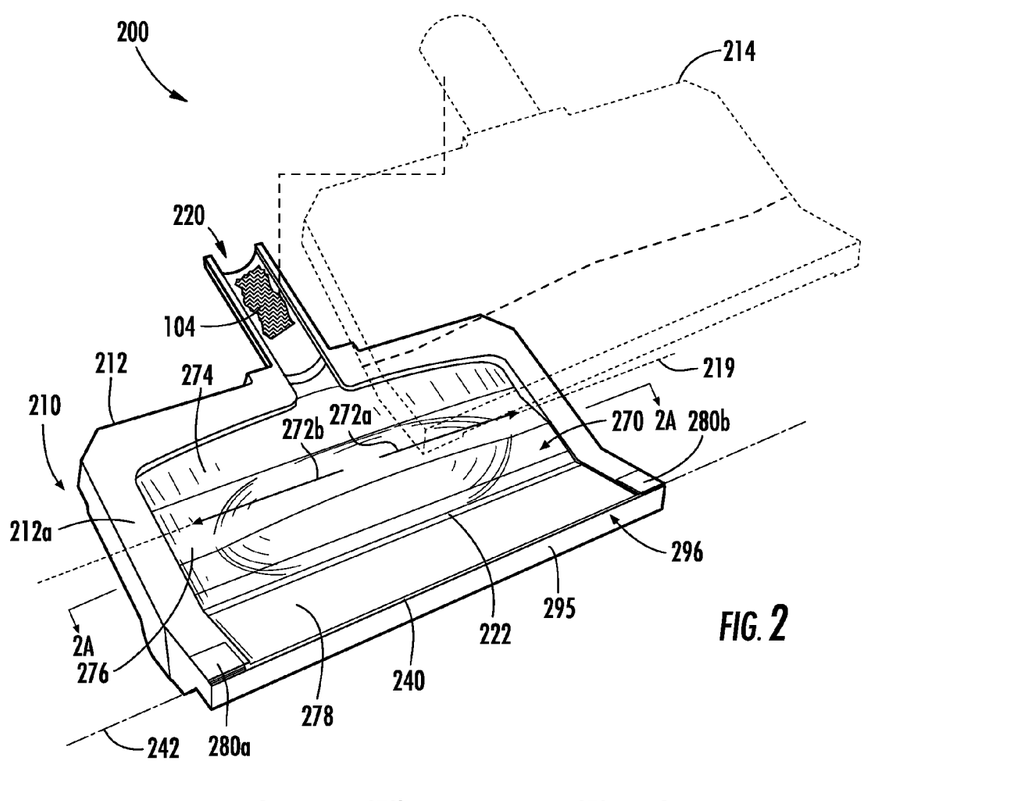
FIG. 2 is an exploded, top perspective view of an applicator according to an example embodiment as disclosed herein.
Figure 2A:
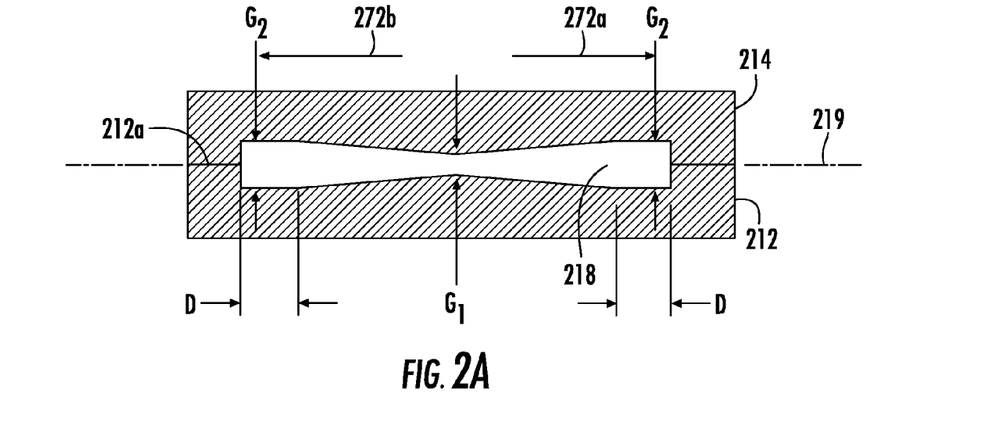
FIG. 2A is a sectional view of the applicator along line 2A-2A of FIG. 2.

As shown in FIGS. 2 and 2A, one example applicator 200 includes a flow distribution device 210 with a first half portion 212 and a second half portion 214 (shown in phantom for clarity). The first half portion 212 includes peripheral interface surfaces 212a configured to provide a fluid seal with corresponding interface surfaces of the second half portion 214. Once sealed together, the first and second half portions 212, 214 can define an interior area 218 extending between an inlet port 220 and an elongated outlet port 240. As shown, the inlet port 220 can comprise a conduit portion configured to receive the cement mixture 104. As shown, the inlet port 220 can be symmetrically disposed along a central axis of symmetry of the applicator 200. In addition, or alternatively, the inlet port 220 may be located near one or both sides or other locations of the applicator. For instance, although shown at a rear center portion of the applicator, the inlet port may be located adjacent a rear side portion of the applicator.

The elongated outlet port 240 can extend along an elongated axis 242. In one example, the elongated outlet port 240 can define a slot extending along the elongated axis 242. For instance, the slot can have substantially the same slot width along a length of the elongated outlet port 240. Alternatively, the slot width may vary along the length of the elongated outlet port 240. A nozzle 295 can be provided to define the elongated outlet port 240. The nozzle 295 can be attached to the flow distribution device 210. For example, as shown, the nozzle 295 can be integral with the flow distribution device 210. In alternative examples, the nozzle 295 can be removably attached to the flow distribution device 210.

The flow distribution device 210 can be configured to distribute the cement mixture 104 between the inlet port 220 and the elongated outlet port 240 to exit the elongated outlet port 240 with a predetermined velocity profile such as the illustrated substantially uniform velocity profile 250 (See FIG. 3) along the elongated axis 242. For example, the flow distribution device 210 can include interior contours 270 at least partially defining the interior area between an inlet port 220 and an elongated outlet port 240. The interior contours 270 can be configured to decrease a resistance to a flow of a cement mixture 104 in one or more lateral directions 272a, 272b from the inlet port 220 along a path 219 located upstream from the elongated outlet port 240. The interior contours 270 can be provided different shapes and surface topographies at different locations of the interior area. For example, the interior contours 270 can include a first surface area 274 shown to be a planar area although other surface topographies may be provided in further examples. The interior contours 270 can also include a second surface area 276 located downstream from the first surface area 274. The second surface area 276 can have a nonplanar configuration designed to decrease a resistance to a flow of the cement mixture 104 in the lateral directions 272a, 272b from the inlet port 220 along the path 219 located upstream from the elongated outlet port 240. For example, the second surface area 276 can include one or a combination of concave portions, convex portions, planar portions, sloped surfaces, obstructions, or other surface configurations. Still further, the interior contours 270 can include a third surface area 278 located downstream from the second surface area 276. As shown, the third surface area 278 can be a planar area although other surface topographies may be provided in further examples. Although not shown, the interior area may be provided with more or less interior areas. For example, the second surface area 276 may be provided alone or in combination with one or more other surface areas.

As shown, the interior contours 270 can be located on the first half portion 212 of the flow distribution device 210. As shown (see FIG. 2A), a substantial mirror image of the contours found on the first half portion 212 can also be provided on the second half portion 214. In further examples, only one of the half portions may be provided with significant contours. For example, the first half portion 212 may be provided with the interior contours 270 while the second half portion 214 includes a different interior shape, such as a shape with concave portions, convex portions, planar portions, sloped surfaces, obstructions and/or contours that may not have corresponding contour counterparts on the first half portion 212.

Figure 3:
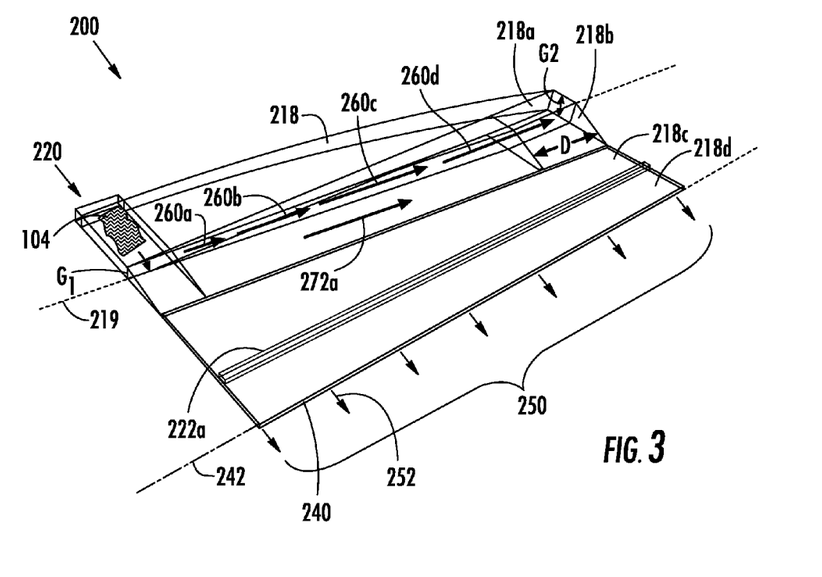
FIG. 3 is a schematic perspective view of an interior area of a quarter section of the example applicator of FIG. 2.

In another example, the interior area 218 can also include a gap that increases in size in the lateral direction along the path 219. For example, as shown in FIG. 2A, a central portion of the interior area 218 can include a first gap "$G_1$" that increases in size to a second gap "$G_2$" in the first lateral direction 272a. Likewise, the first gap "$G_1$" that can also increase in size to the second gap "$G_2$" in the second lateral direction 272b. Providing a gap that increases in the lateral direction can help decrease a resistance to a flow of the cement mixture 104 in the lateral directions 272a, 272b. Thus, it will be appreciated that the reduced size of the first gap "$G_1$" will encourage an increased amount of cement mixture 104 to travel laterally as the cement mixture 104 propagates in a downstream direction from the inlet port 220 to the elongated outlet port 240. FIG. 3 schematically depicts an interior area of a quarter section of the applicator 200. The quarter section depicts a quarter of the interior area 218 defined between the first half portion 212 and the second half portion 214 of the flow distribution device 210. As shown, the interior area 218 includes a first portion 218a wherein the first gap "$G_1$" increases in size to the second gap "$G_2$" in the first lateral direction 272a. The interior area 218 further includes a second portion 218b that transitions between the first portion 218a and a substantially constant gap area 218c. It is noted that the ends of the first portion 218a may have a constant second gap "$G_2$" along a distance "D" of the first portion 218a. Providing the constant second gap "$G_2$" at the ends of the first portion 218a may have a desired effect of flattening out the flow profile of the cement mixture 104 nearing the side sections of the interior area 218 of the applicator 200. Although the interior surface area along the distance "D" may be substantially flat, the area may be angled (e.g., at about five degrees) to further balance flow resistance in further examples.

The interior area 218 of the flow distribution device 210 can also be provided with an elongated trough 222 (see FIG. 2) configured to balance the flow resistance of the cement mixture 104 between the middle section and the side section of the flow distribution device 210. Balancing the flow resistance can provide a substantially constant resistance to the flow of cement mixture at the location of the elongated equalizer structure 222 in the lateral directions 272a, 272b. The elongated equalizer structure 222 can be positioned downstream from a path defined by the first portion 218a. For example, the elongated equalizer structure 222 can be positioned in the interior area 218 between the gap area 218c and a further constant gap area 218d.

As shown in FIG. 3, the elongated trough 222 can define an elongated area 222a although other features may be provided in further examples. For instance, the elongated structure can comprise one or more indentations, grooves, bumps and/or other structural features. Furthermore, the elongated equalizer structure 222 can be positioned upstream from the elongated outlet port 240 in further examples. For instance, as shown, the elongated trough is illustrated as positioned upstream from the elongated outlet port 240 and extending transverse to the flow of the cement mixture through the elongated outlet port 240 of the applicator 200. Although not shown, elongated equalizer structure may be provided at the elongated outlet port rather than upstream from the elongated outlet port as illustrated. Thus, it is possible to balance the flow at the elongated outlet port rather than upstream from the elongated outlet port. Such a configuration may be incorporated in any of the example flow distribution devices herein.

The applicator 200 can also include a pair of spacer blocks 280a, 280b. As shown, the spacer blocks 280a, 280b can be mounted to the nozzle 295 such that the elongated outlet port 240 is positioned between the spacer blocks. The spacer blocks can be adjustable and/or removable to allow the applicator to accommodate a particular apparatus and/or honeycomb body. In one example, the pair of spacer blocks can each extend beyond an end surface 296 of the nozzle 295.

An example method of applying a cement mixture 104 to an exposed matrix 102 of intersecting walls of a honeycomb body 100 with the applicator 200 illustrated in FIGS. 2, 2A and 3 will now be described. The method includes the steps of feeding the cement mixture 104 into the inlet port 220 of the flow distribution device 210 and forcing the cement mixture 104 to exit the elongated outlet port 240 with a substantially uniform velocity profile 250 along the elongated axis 242. The substantially uniform velocity profile 250 is represented by a plurality of substantially parallel and identical velocity vectors 252 that have substantially the same magnitude. These velocity vectors 252 can extend at a wide variety of angles with respect to the elongated axis 242 while remaining substantially parallel with respect to one another. For example, as shown, the velocity vectors 252 can be substantially perpendicular to the elongated axis 242. Thus, the cement mixture 104 can be forced to exit the elongated outlet port 240 in a direction that is substantially perpendicular to the elongated axis 242.

The method can provide the cement mixture 104 with an upstream velocity profile 260a-d extending along the path 219 extending along the first portion 218a of the interior area 218. As shown, the upstream velocity profile 260a-d increases in a lateral direction from the inlet port 220 along a path located upstream from the elongated outlet port 240. Indeed, as shown in FIG. 3, the velocity profile is represented by a series of collinear velocity vectors 260a, 260b, 260c, 260d that successively increase in magnitude, indicating an increase in velocity in the lateral direction.

A resistance to the flow of the cement mixture 104 is decreased in the lateral direction at least within the illustrated first portion 218a. For example, as shown by the interior area configuration in FIG. 3, the first portion 218a of the interior area 218 includes interior contours 270 that cooperate to provide a gap that increases in size in the first lateral direction 272a and the second lateral direction 272b. As such, resistance to lateral flow is decreased in the lateral direction to help transport portions of the cement mixture 104 outwardly faster as the cement mixture 104 travels in the downstream direction. Thus, the resistance to the flow of the cement mixture 104 is increased in an area of the middle section but decreased toward the side section. This in turn reduces the flow rate of the cement mixture 104 at the middle section and increases the flow rate to the side sections of the flow distribution device 210. By controlling the flow of the cement mixture in this manner, undesired concentration of the cement mixture 104 in the middle section can be avoided that would otherwise lead to a non-uniform application of the cement mixture 104 to the exposed matrix 102 of the honeycomb body 100.

The method can also provide the step of balancing the resistance at a position located downstream from the path defined by the first portion 218a. Once balanced, the resistance is substantially constant in the lateral direction at the elongated outlet port 240. As apparent in FIG. 3, for example, the elongated equalizer structure 222 defining the elongated area 222a can be positioned downstream from the path defined by the first portion 218a. As shown, the elongated equalizer structure 222 and corresponding elongated area 222a can be positioned in the interior area 218 between the gap area 218c and a further constant gap area 218d. Accordingly, the elongated equalizer structure 222 can act as an accumulator to create a pressure drop as the cement mixture 104 enters the elongated area 222a. The pressure drop and accumulator effect of the elongated area 222a can promote a balanced feeding of the material passing from the gap area 218c to the further gap area 218d. The cement mixture 104 can then be deposited on the exposed matrix 102 of the honeycomb body 100 once the cement mixture exits the elongated outlet port 240.

It will therefore be appreciated that methods herein can inhibit pooling of the cement mixture 104 in the middle section of the applicator 200. As shown in FIGS. 2, 2A and 3, the gap "$G_1$" is smaller in the middle section than the gap "$G_2$" at the side sections. Therefore, the flow resistance is relatively high in the middle section and relatively low in the side sections. The overall flow resistance from the inlet port 220 through the elongated outlet port 240 may therefore be balanced between the middle and side sections. Furthermore, provisions may be provided to adjust the gaps to change the ratio of the flow resistance from the middle and side sections to provide an appropriate flow distribution depending on the application, materials used, or other parameters. For instance, either the first half portion 212 or the second half portion 214 may be designed to have alternative configurations to cooperate with the other half portion. Thus, different combinations of half portions may be provided to obtain the desired flow distribution. Since under- or over-adjustment of the resistance ratio can lead to flow concentration in the middle or toward the side sections, proper adjustment of the gap ratio can provide a more uniform outflow at the elongated outlet port 240. In general, the flow resistance and hence the flow pattern of the cement mixture 104 may be controlled by changing surface characteristics of the interior area, adjusting the gap distance throughout the interior area or other parameters of the flow distribution device 210.

Figure 4:
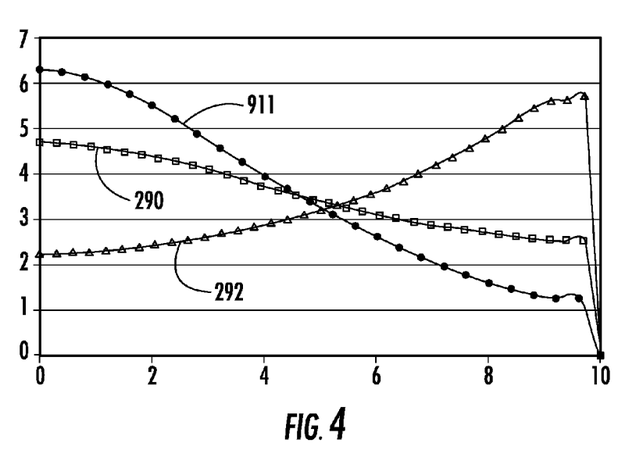
FIG. 4 graphically illustrates a comparison of outflow velocity profiles of the example applicator of FIG. 2 to the outflow velocity profiles of the conventional applicator of FIG. 1.

FIG. 4 shows various modeled outflow velocity profiles. The Y-axis represents the velocity, in inches/second, of the cement mixture exiting the elongated outlet port. The X-axis represents the distance, in inches, from the center of the middle section to the outer end of one side section. Line 290 shows more uniform flow is achievable with the device of FIGS. 2, 2A and 3 when the interior contours 270 are adjusted to control fluid flow toward the middle section of the applicator 200. Likewise, line 292 also shows that a more uniform flow can be achieved when the interior contours 270 are adjusted to control fluid flow toward the side section on the applicator 200. In contrast, modeling results for the applicator 901 of FIG. 1 results in non-uniform flow as indicated by line 911 in FIG. 4.

Figure 5:
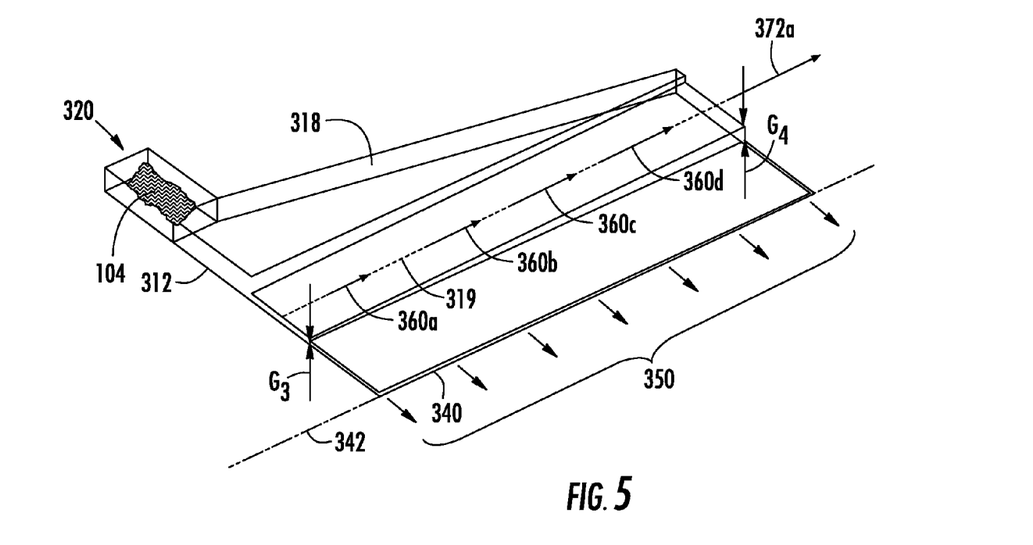
FIG. 5 is a schematic perspective view of a quarter section of an interior area of an applicator according to another embodiment of the disclosure.

FIG. 5 schematically depicts a quarter section of an interior area 318 of an applicator in accordance with another example. The applicator can have similar, such as identical, characteristics described with respect to the applicator 200 described above. As shown, the interior area 318 extends between an inlet port 320 and an elongated outlet port 340. As shown, the inlet port 320 can comprise a conduit portion configured to receive the cement mixture 104. As shown, the inlet port 320 can be symmetrically disposed along a central axis of symmetry of the applicator. In addition, or alternatively, the inlet port 320 may be located near one or both sides or other locations of the applicator. For instance, although shown at a rear center portion of the applicator, the inlet port may be located adjacent a rear side portion of the applicator.

The elongated outlet port 340 can extend along an elongated axis 342 and can comprise characteristic described with respect to the elongated outlet port 240 described above. The flow distribution device can also be configured to distribute the cement mixture 104 between the inlet port 320 and the elongated outlet port 340 to exit the elongated outlet port 340 with a predetermined velocity profile such as the illustrated substantially uniform velocity profile 350 along the elongated axis 342. For example, the flow distribution device can include interior contours configured to decrease a resistance to a flow of a cement mixture 104 in one or more lateral directions 372a from the inlet port 320 along a path 319 located upstream from the elongated outlet port 340.

In another example, the interior area 318 can also include a gap that increases in size in the lateral direction along the path 319. For example, the illustrated interior area 318 can include a first gap "$G_3$" that increases in size to a second gap "$G_4$" in the first lateral direction 372a. Likewise, the first gap "$G_3$" that can also increase in size to the second gap "$G_4$" in the second opposed lateral direction (not shown). Providing a gap that increases in the lateral direction can help decrease a resistance to a flow of the cement mixture 104 in the lateral direction 372a (and the opposite lateral direction, not shown).

Although not shown, the interior area 318 of the flow distribution device can also be provided with an elongated equalizer structure similar, such as identical, to the elongated equalizer structure 222 discussed above. Still further, although not shown, the applicator can also include a pair of spacer blocks similar to the spacer blocks 280a, 280b described above.

An example method of applying a cement mixture 104 to an exposed matrix 102 of intersecting walls of a honeycomb body 100 with an applicator associated with FIG. 3 will now be described. The method includes the steps of feeding the cement mixture 104 into the inlet port 320 of the flow distribution device 310 and forcing the cement mixture 104 to exit the elongated outlet port 340 with a substantially uniform velocity profile 350 along the elongated axis 342. The method can provide the cement mixture 104 with an upstream velocity profile 360a-d extending along the path 319 extending along a portion of the interior area 318. As shown, the upstream velocity profile 360a-d increases in a lateral direction from the inlet port 320 along a path located upstream from the elongated outlet port 340. Indeed, as shown in FIG. 5, the velocity profile is represented by a series of collinear velocity vectors 360a, 360b, 360c, 360d that successively increase in magnitude, indicating an increase in velocity in the lateral direction.

A resistance to the flow of the cement mixture 104 is decreased in the lateral direction at least along the path 319. For example, the interior area 318 can include interior contours that cooperate to provide a gap that increases in size in the first lateral direction 372a and the second lateral direction (not shown). As such, resistance to lateral flow is decreased in the lateral direction to help transport portions of the cement mixture 104 outwardly faster as the cement mixture 104 travels in the downstream direction. By controlling the flow of the cement mixture in this manner, undesired concentration of the cement mixture 104 in the middle section can be avoided that would otherwise lead to a non-uniform application of the cement mixture 104 to the exposed matrix 102 of the honeycomb body 100.

The method can also include the step of balancing the resistance at a position located downstream from the path 319. For example, the flow distribution device 310 can include an elongated equalizer structure similar to the elongated equalizer structure 222 described above. Accordingly, the elongated equalizer structure, if provided, can help establish a balanced feeding of the cement mixture exits the elongated outlet port 240.

Figure 6:
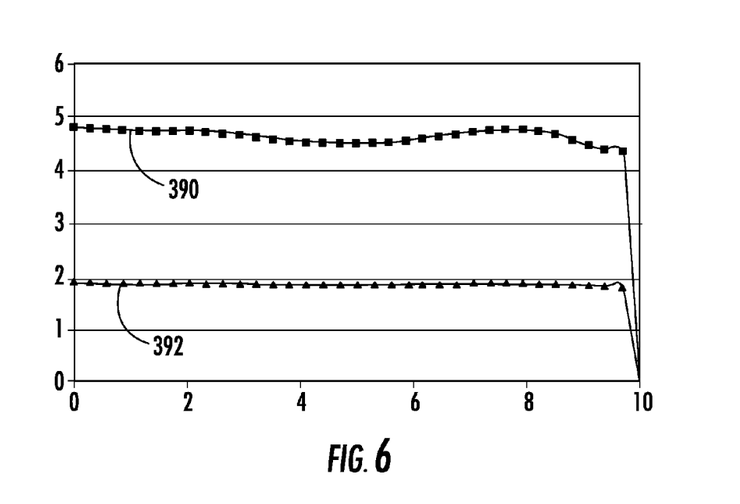
FIG. 6 graphically illustrates outflow velocity profiles using the applicator associated with FIG. 5.

FIG. 6 shows velocity profiles calculated by CFD modeling for an applicator associated with FIG. 5. The Y-axis represents the velocity, in inches/second, of the cement mixture exiting the elongated outlet port. The X-axis represents the distance, in inches, from the center of the middle section to the outer end of one side section. Lines 390, 392 show resultant outflow profiles corresponding to flow rates of 8.19 cm$^3$/second (0.5 inch$^3$/sec) and 20.48 cm$^3$/second (1.25 inch$^3$/second), respectively.

Figure 8A:
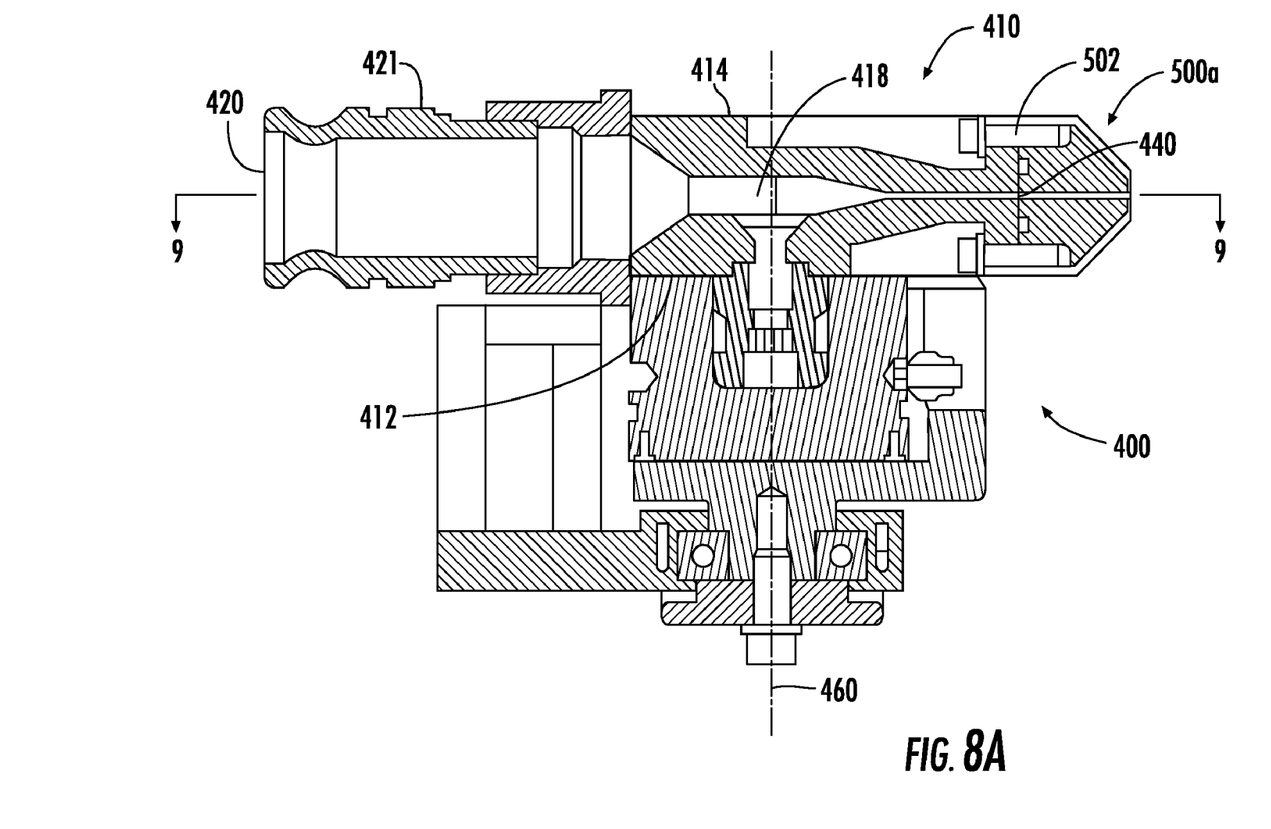
FIG. 8A is a sectional view of the applicator along line 8A-8A of FIG. 7.
Figure 8B:
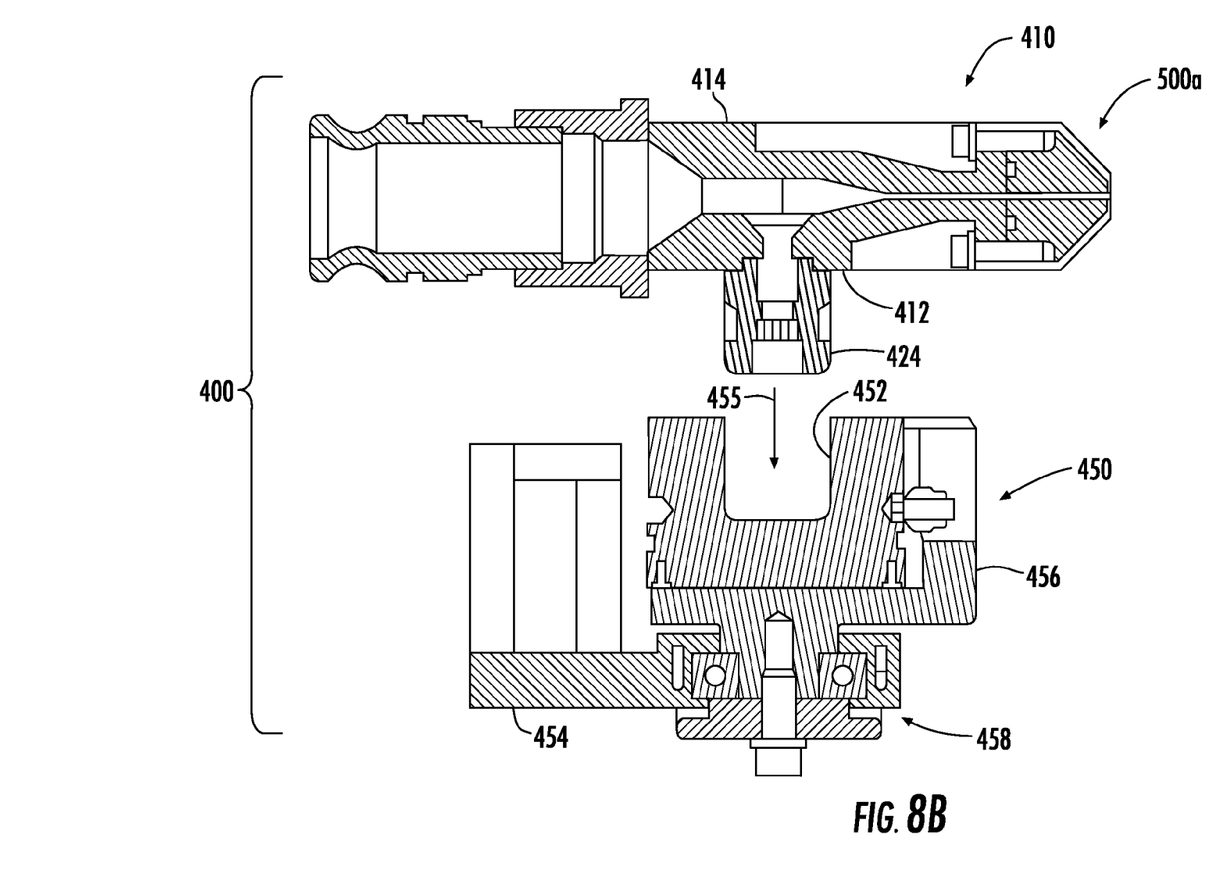
FIG. 8B is an exploded view of the applicator of FIG. 8A.
Figure 9:
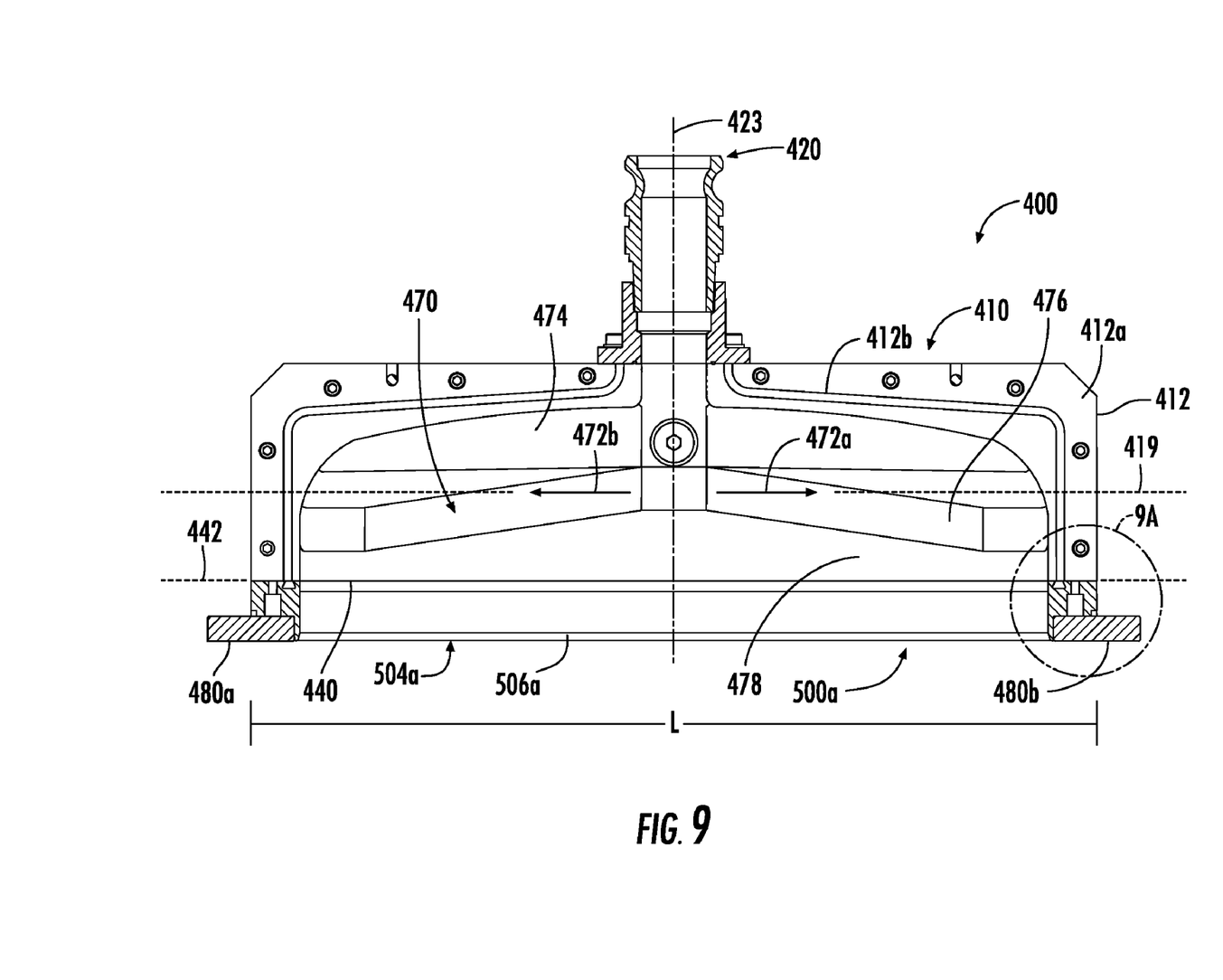
FIG. 9 is a sectional view of the applicator along line 9-9 of FIG. 8A.

FIGS. 7, 8A, 8B, 9, 9A, 10 and 11A illustrate an applicator 400 in accordance with still another example embodiment. The applicator 400 can include features that are similar, such as identical, to features of the applicator 200 and/or the applicator associated with FIG. 5. As shown, the applicator 400 includes a flow distribution device 410 with a first half portion 412 and a second half portion 414. As shown in FIG. 9, the first half portion 412 includes peripheral interface surfaces 412a with a seat 412b configured to receive a gasket to provide a fluid seal with corresponding interface surfaces of the second half portion 414. As shown in FIG. 8A, once sealed together, the first and second half portions 412, 414 define an interior area 418 extending between an inlet port 420 and an elongated outlet port 440. As shown, the inlet port 420 can comprise a conduit portion 421 configured to receive the cement mixture. As shown in FIG. 9, the inlet port 420 can be symmetrically disposed along a central axis 423 of symmetry of the applicator 400. In addition, or alternatively, the inlet port 420 may be located near one or both sides or other locations of the applicator. For instance, although shown at a rear center portion of the applicator, the inlet port may be located adjacent a rear side portion of the applicator.

The elongated outlet port 440 can extend along an elongated axis 442. In one example, the elongated outlet port 440 can define a slot extending along the elongated axis 442. For instance, the slot can have substantially the same slot width along a length of the elongated outlet port 440. Alternatively, the slot width may vary along the length of the elongated outlet port 440.

The flow distribution device 410 can be configured to distribute the cement mixture 104 between the inlet port 420 and the elongated outlet port 440 to exit the elongated outlet port 440 with a predetermined velocity profile such as the velocity profile associated with the elongated outlet port 240, 340 discussed above. As discussed below, the elongated outlet port 440 can be placed in fluid communication with a nozzle, such as the illustrated removable nozzle 500a, mounted to an end of the flow distribution device 410.

The flow distribution device 410 can also include contours similar, such as identical to the contours of the flow distribution devices 210, 310 discussed above. For example, the flow distribution device 410 can include interior contours 470 at least partially defining the interior area between an inlet port 420 and an elongated outlet port 440. The interior contours 470 can be configured to decrease a resistance to a flow of a cement mixture 104 in one or more lateral directions 472a, 472b from the inlet port 420 along a path 419 located upstream from the elongated outlet port 440. The interior contours 470 can be provided different shapes and surface topographies at different locations of the interior area. For example, the interior contours 470 can include a first surface area 474 shown to be a planar area although other surface topographies may be provided in further examples. The interior contours 470 can also include a second surface area 476 located downstream from the first surface area 474. The second surface area 476 can have a nonplanar configuration designed to decrease a resistance to a flow of the cement mixture 104 in the lateral directions 472a, 472b from the inlet port 420 along the path 419 located upstream from the elongated outlet port 440. For example, the second surface area 476 can include one or a combination of concave portions, convex portions, planar portions, sloped surfaces, obstructions, or other surface configurations. Still further, the interior contours 470 can include a third surface area 478 located downstream from the second surface area 476. The third surface area 478 can be a planar area, a transition to a planar area, or other surface topographies. Although not shown, the interior area may be provided with more or less interior areas. For example, the second surface area 276 may be provided alone or in combination with one or more other surface areas.

As shown, the interior contours 470 are located on the first half portion 412 of the flow distribution device 410. As apparent in FIGS. 8A and 8B, a mirror image of the contours found on the first half portion 412 can also be provided on the second half portion 414. In further examples, only one of the half portions may be provided with significant contours. For instance the first half portion may be provided with the interior contours while the second half portion includes a different interior shape, such as a shape with concave portions, convex portions, planar portions, sloped surfaces, obstructions and/or contours that may not have corresponding contour counterparts on the first half portion.

In another example, the interior area 418 can also include a gap that increases in size in the lateral direction along the path 219. The increased gap size and can be similar to the change in gap size of the interior area 218 shown in FIGS. 2A and 3 wherein can include a first gap "$G_1$" of a central portion of the interior area 218 increases in size to a second gap "$G_2$" in the first and second lateral directions. As mentioned previously providing a gap that increases in the lateral direction can help decrease a resistance to a flow of the cement mixture 104 in the lateral directions 472a, 472b.

Figure 9A:
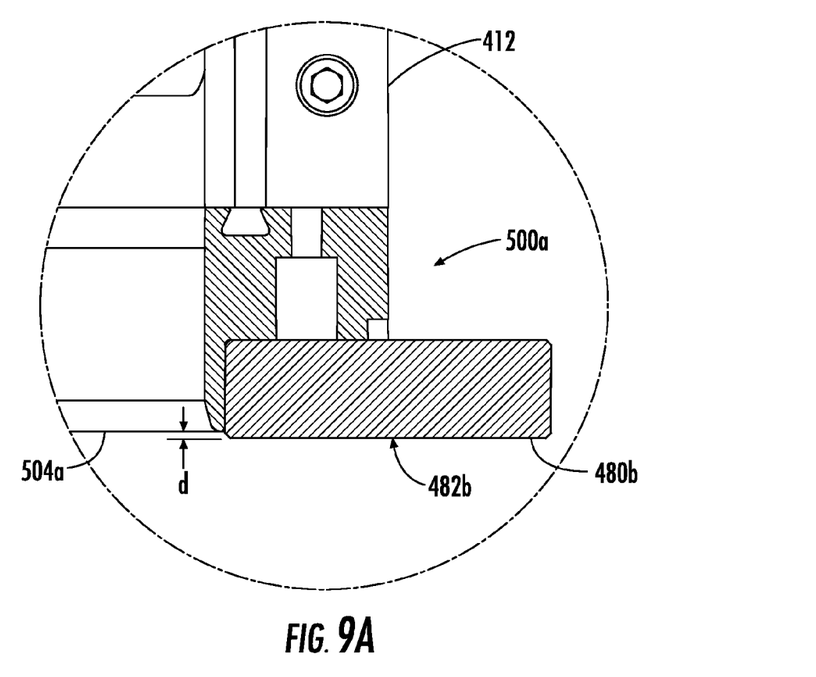
FIG. 9A is an enlarged view of a portion of the applicator shown in FIG. 9.

The applicator 400 can also include a pair of spacer blocks 480a, 480b. As shown, the spacer blocks 480a, 480b can be mounted to a nozzle 500a such that an elongated outlet port 506a is positioned between the spacer blocks. The spacer blocks can be adjustable and/or removable to allow the applicator to accommodate a particular apparatus and/or honeycomb body. In one example, the pair of spacer blocks can each extend beyond an end surface 504a of the nozzle 500a. For example, as shown in FIG. 9A, the spacer block 480b has an outer surface 482b that extends a distance "d" from the end surface 504a of the nozzle 500a. In some embodiments, the distance "d" can be no higher than 0.254 mm (0.01 inches), although in other embodiments, other distances greater or equal to 0.254 mm (0.01 inches) may be incorporated.

Applicators disclosed herein can include nozzles that may be integral or removable from the flow distribution device. For example, the flow distribution device 210 is shown to include an integral nozzle 295. It will be appreciated that the nozzle 295 of the flow distribution device 210 can be removable in further examples. Likewise, the applicator 400 can include an integral or removable nozzle. Various nozzles can be used with applicators. FIGS. 11A-11F illustrate example nozzles although other nozzles may be incorporated in accordance with aspects of the invention. The example nozzles are shown to have similar, such as identical features, although further nozzles may have different features in further examples. For example, each nozzle can include an end surface that can extend along a length of the nozzle. For instance, the end surface can extend continuously or intermittently along the entire length of the nozzle. In further examples, the end surface may extend along a portion of the length of the nozzle. Moreover, each nozzle can include an elongated outlet port extending along the length of the nozzle and configured for fluid communication with the elongated outlet port of the flow distribution device. In one example, the elongated outlet port of the nozzle can define a slot extending along an elongated axis of the nozzle. For instance, the slot can have substantially the same slot width along a length of the elongated outlet port of the nozzle. Alternatively, the slot width may vary along the length of the elongated outlet port. The width of the slot can comprise a wide variety of dimensions. In some embodiments, the width can be from about 1.27 mm (0.05 inches) to about 5.08 mm (0.2 inches), such as about 2.54 mm (0.1 inches).

Figure 11A:
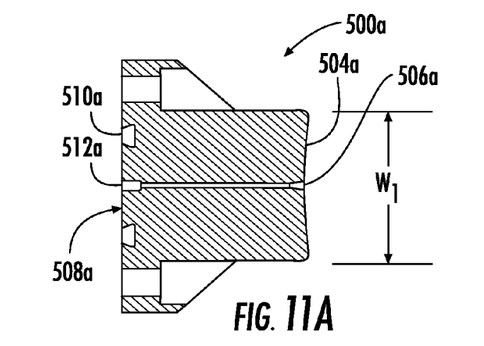
FIGS. 11A-11F each illustrates a sectional view of an alternative nozzle in accordance example with aspects as disclosed herein.
Figure 11B:
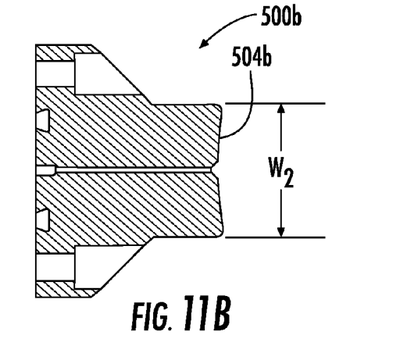
Figure 11C:
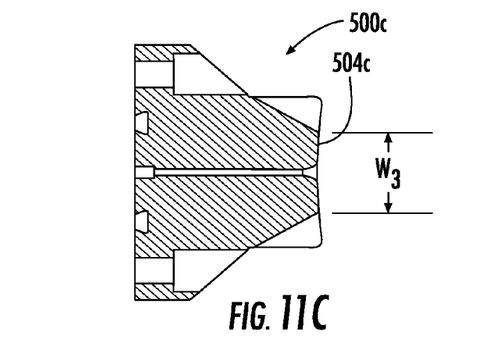
Figure 11D:
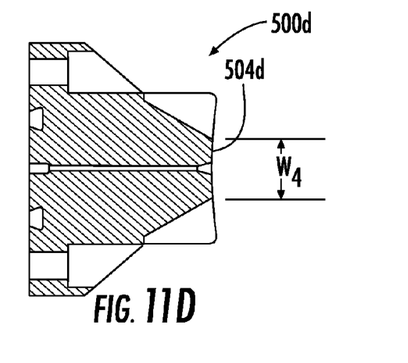
Figure 11E:
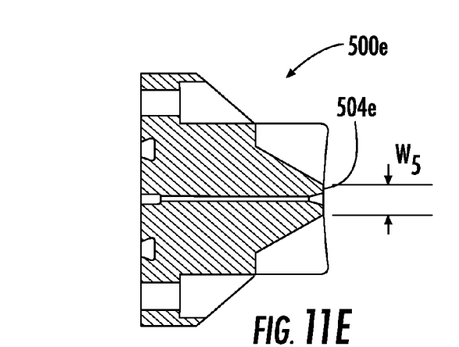
Figure 11F:
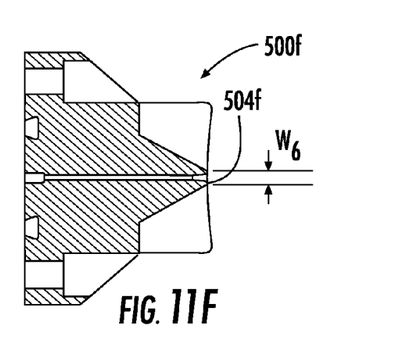

As shown in FIG. 8A, a nozzle 500a can be removably attached with fasteners 502 to the first and second half portions 412, 414 of the flow distribution device 410. As shown in FIG. 11A, the example nozzle 500a includes an end surface 504a that can be elongated along a length "L" of the nozzle 500a (see FIG. 9). The end surface 504a includes an elongated outlet port 506a extending along the length "L" of the nozzle 500a and in fluid communication with the elongated outlet port 440 of the flow distribution device 410. The elongated outlet port 506a can bisect the end surface 504a although the elongated outlet port may be provided at different locations with respect to the end surface in further examples. In some embodiments, the end surface of each nozzle can include a transverse width from about 2.54 mm (0.1 inches) to about 5.08 cm (2 inches) along the length "L" of the nozzle 500a. In one set of embodiments, the illustrated end surface 504a is provided with a width "$W_1$" from about 3.81 cm (1.5 inches) to about 6.35 cm (2.5 inches), and in some of these embodiments from about 4.32 cm (1.7 inches) to about 5.59 cm (2.2 inches), and in some of these embodiments from about 4.57 cm (1.8 inches) to about 5.33 cm (2.1 inches), and in some of these embodiments from about 4.83 cm (1.9 inches) to about 5.08 cm (2.0 inches), such as about 4.92 cm (1.938 inches). Moreover, as shown, the end surface 504a can be concave although the end surface may be planar or have other shapes in other examples.

As further shown in FIG. 11A, the nozzle 500a may be provided with a rear surface 508a that may be provide with grooves 510a configured to receive a gasket facilitating a fluid seal between the nozzle 500a and the flow distribution device. The rear surface 508a can also be provided with an elongated equalizer structure 512a configured to balance the flow resistance of the cement mixture 104. As shown, the example elongated equalizer structure 512a can comprise various structures such as the illustrated elongated trough. The elongated equalizer structure 512a can also assist in proper alignment of the elongated outlet port 506a of the nozzle 500a with the elongated outlet port 440 of the flow distribution device 410. Indeed, the elongated equalizer structure 512a can comprise the illustrated enlarged elongated opening that can compensate for a slight misalignment of elongated outlet ports 506a, 440.

FIGS. 11B-11F illustrate other example nozzles 500b, 500c, 500d, 500e, 500f As shown, each nozzle 500b, 500c, 500d, 500e, 500f includes a respective end surface 504b, 504c, 504d, 504e, 504f with a respective width "$W_2$", "$W_3$", "$W_4$", "$W_5$", "$W_6$". The illustrated widths are examples of a wide range of widths possible although other widths may be used in further examples. For example, the end surface 504b of the nozzle 500b can be provided with a width "$W_2$" from about 3.05 cm (1.2 inches) to about 5.59 cm (2.2 inches), or from about 3.56 cm (1.4 inches) to about 5.08 cm (2.0 inches), or from about 3.81 cm (1.5 inches) to about 4.83 cm (1.9 inches), or from about 4.06 cm (1.6 inches) to about 4.32 cm (1.7 inches), such as about 4.29 cm (1.688 inches). In another example, the end surface 504c of the nozzle 500c can be provided with a width "$W_3$" from about 1.27 cm (0.5 inches) to about 3.81 cm (1.5 inches), or from about 1.78 cm (0.7 inches) to about 3.302 cm (1.3 inches), or from about 2.032 cm (0.8 inches) to about 3.05 cm (1.2 inches), or from about 2.29 cm (0.9 inches) to about 2.79 cm (1.1 inches), such as about 2.54 cm (1 inch). In still another example, the end surface 504d of the nozzle 500d can be provided with a width "$W_4$" from about 5.08 mm (0.2 inches) to about 3.05 cm (1.2 inches), or from about 1.02 cm (0.4 inches) to about 2.54 cm (1 inch), or from about 1.27 cm (0.5 inches) to about 2.29 cm (0.9 inches), or from about 1.52 cm (0.6 inches) to about 2.03 cm (0.8 inches), such as about 1.91 cm (0.75 inches). In yet another example, the end surface 504e of the nozzle 500e can be provided with a width "$W_5$" from about 2.54 mm (0.1 inches) to about 2.79 cm (1.1 inches), or from about 5.08 mm (0.2 inches) to about 2.03 cm (0.8 inches), or from about 7.62 mm (0.3 inches) to about 15.24 mm (0.6 inches), or from about 7.62 mm (0.3 inches) to about 10.16 mm (0.4 inches), such as about 9.53 mm (0.375 inches). In another example, the end surface 504f of the nozzle 500f can be provided with a width "$W_6$" from about 2.54 mm (0.1 inches) to about 5.08 mm (0.2 inches), such as about 3.51 mm (0.138 inches). As shown, the end surfaces 504a, 504b, 504c, 504d, 504e, 504f can be concave although the end surfaces may be planar or have other shapes in further examples. Although not shown, the end surface may also comprise a knife edge with a relatively sharp or blunted end.

An example method of applying a cement mixture 104 to an exposed matrix 102 of intersecting walls of a honeycomb body 100 with the applicator 400 will now be described. As shown in FIG. 8B, the flow distribution device 410 can be provided with a locking member 424 configured to be selectively received within a socket 452 of a support apparatus 450. As shown, the flow distribution device 410 can be inserted in direction 455 until the locking member 424 is received within the socket 452. Once the locking member 424 is received within the socket 452, an actuator or other device can be manipulated to fix the locking member within the socket. The support apparatus 450 can include a support arm 454 rotatably connected to an adapter 456 by a bearing assembly 458. Once connected, the flow distribution device 410 together with the adapter 456 can be selectively rotated with respect to the support arm 454 about axis 460.

Once the applicator 400 is assembled, the support arm 454 can be used to bring the pair of spacer blocks 480a, 480b into engagement with respective support members 106a, 106b. As described in PCT International Application No. PCT/US2008/002813, filed Feb. 29, 2008 that is herein incorporated by reference in its entirety, it is possible for the upper support member 106a to be positioned out of vertical alignment with the lower support member 106b (see also FIG. 10 where there may be a slight misalignment). As the upper spacer block 480a engages the upper support member 106a and the lower spacer block 480b engages the lower support member 106b, the flow distribution device 410 can rotate about the axis 460 to provide appropriate consistent spacing between end surface 504a and the exposed matrix 102 of intersecting walls of the honeycomb body 100. The spacer blocks 480a, 480b can be adjustable and/or removable to allow the applicator to accommodate a particular apparatus and/or honeycomb body. In one example, the pair of spacer blocks can each extend beyond an end surface 504a of the nozzle 500a. For example, as shown in FIG. 9A, the spacer block 480b has an outer surface 482b that extends a distance "d" from the end surface 504a of the nozzle 500a. Once the outer surface 482b of the spacer blocks 480a, 480b engage the corresponding upper and lower support members 106a, 106b, the end surface 504a of the nozzle 500a will be consistently spaced a distance "d" from the outer surface of the spacer blocks 480a, 480b. As the honeycomb body 100 is appropriately centered with respect to the upper and lower support members 106a, 106b, the end surface 504a of the nozzle 500a will be appropriately distanced from the exposed matrix 102 of intersecting walls of the honeycomb body 100.

Figure 10:
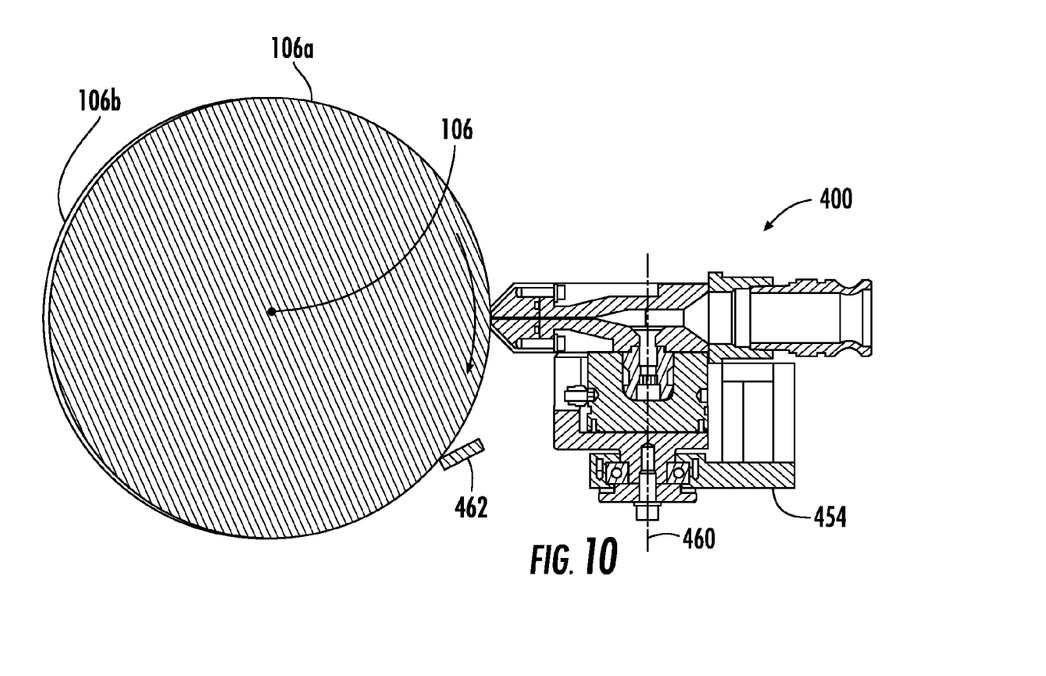
FIG. 10 is a sectional view of the applicator and honeycomb body along line 10-10 of FIG. 7.

As further shown in FIG. 10, the nozzle 500a can be oriented such that the end surface 502a faces a direction substantially perpendicular to a central axis 106 of the honeycomb body 100. As further illustrated, the end surface 502a of the nozzle 500a can be concave in a direction facing the honeycomb body 100.

The method includes the steps of feeding the cement mixture 104 into the inlet port 420 of the flow distribution device 410 and forcing the cement mixture 104 to exit the elongated outlet port 440 of the flow distribution device 410 and the elongated outlet port 506a of the nozzle 500a with a substantially uniform velocity profile as described with respect to the applicator 200 above.

The method can provide the cement mixture 104 with an upstream velocity profile extending along the path 419 extending along the interior area 418. The upstream velocity profile increases in a lateral direction along the path 419 from the inlet port 420 along a path located upstream from the elongated outlet port 440. A resistance to the flow of the cement mixture 104 is decreased in the lateral direction at least within a portion of the interior area. As such, the cement mixture 104 can be transported outwardly faster as the cement mixture 104 travels in the downstream direction. Thus, the resistance to the flow of the cement mixture 104 is increased in an area of the middle section but decreased toward the side section. This in turn decreases a flow rate of the cement mixture 104 around the middle section and increases the flow rate to the side sections of the flow distribution device 210. By controlling the flow of the cement mixture in this manner, undesired concentration of the cement mixture 104 in the middle section can be avoided that would otherwise lead to a non-uniform application of the cement mixture 104 to the exposed matrix 102 of the honeycomb body 100.

The method can also provide the step of balancing the resistance at a position located downstream from the path 419. Indeed, as the cement mixture 104 reaches the elongated equalizer structure 512a, illustrated enlarged elongated opening causes a pressure drop and somewhat of an accumulation of cement mixture within the enlarged area of the elongated equalizer structure. As such, the cement mixture is balanced and resistance is therefore substantially constant in the lateral direction at the elongated outlet port 440 and the elongated outlet port 506a.

The cement mixture 104 can then be deposited on the exposed matrix 102 of the honeycomb body 100 once the cement mixture exits the elongated outlet port 240. As shown in FIG. 7, the method can include rotating the applicator 400 and the honeycomb body 100 with respect to one another while depositing the cement mixture 104. In one example, the support members 106a, 106b are rotated together with the honeycomb body 100 relative to the applicator 400. As the spacer blocks 480a, 480b ride along the outer periphery of the respective support members 106a, 106b, the flow distribution device 410 can rock back and forth about the axis 460 to help provide a cement mixture layer having a substantially constant thickness disposed on the exposed matrix 102 of the honeycomb body 100. As shown in FIG. 10, a doctor blade 462 can be provided to smooth out the cement mixture. As illustrated, the doctor blade 462 can be separate from the applicator although the doctor blade may be provided as part of the applicator in further examples. In other embodiments, a doctor blade may not be provided.

It will therefore be appreciated that methods herein can inhibit pooling of the cement mixture 104 in the middle section of the applicator. The applicators can include flow distribution devices that deliver uniform covering material flow as needed. Moreover, the nozzle width and surface characteristics can be adjusted to optimize surface characteristics of the cement mixture layer while minimizing waste. Nozzle configurations disclosed herein can demonstrate example features of the invention. Such nozzles can inhibit partial coating or pealing of the cement mixture. For instance, the cement mixture flow rate can be adjusted so that the coated outer peripheral surface of the honeycomb structure is substantially free of defects, inhibiting the occurrence of partial coating caused by pulling off of the coating during the coating process and consequently minimizing material waste. In certain examples, providing the nozzle with a relatively large nozzle width can require a relatively high cement mixture flow rate to produce a defect-free surface. In contrast, a reduced nozzle width can minimize waste and eliminate voids.

Methods herein can apply a cement layer to a ceramic, or ceramic-forming, body. The methods can comprise feeding cement through an applicator having an elongated nozzle with an outlet portion wherein the cement exits the outlet portion with a substantially uniform velocity profile, and the cement is deposited onto an outer surface of the body to form the cement layer. The method can further comprise moving at least one of the applicator and the body with respect to each other. In some embodiments, the cement is fed into an inlet portion of the applicator in an inlet direction, and the cement exits the nozzle at an outlet portion in an outlet direction substantially parallel to the inlet direction. In some embodiments, the nozzle is spaced away from the body while the cement is being deposited on the body. In some embodiments, the cement layer is smoothed by the applicator at the same time that cement is exiting the nozzle.

Example nozzles can be provided with an end surface, such as the above-described concave end surface, that defines a gap at the elongated outlet port of the nozzle. The gap can have a width and extending an overall length L from a first end to a second end, wherein L is greater than the width. In some embodiments, the width of the gap is substantially constant across the length L. The cement mixture can be forced to exit the applicator with a substantially uniform velocity profile. In some embodiments, the velocity of the cement exiting at a center of the nozzle is not more than 3 times the velocity of the cement exiting the nozzle at a position L/10 from the first or second end. In some embodiments, the velocity of the cement exiting at a center of the nozzle is not more than 2 times the velocity of the cement exiting the nozzle at a position L/10 from the first or second end. In some embodiments, the velocity of the cement exiting at a center of the nozzle is less than the velocity of the cement exiting at a position L/10 from the first or second end. In some embodiments, the velocity of the cement exiting at a center of the nozzle is within 50% of the velocity of the cement exiting at a position L/10 from the first or second end. In some embodiments, the velocity of the cement exiting at a center of the nozzle is within 25% of the velocity of the cement exiting at a position L/10 from the first or second end. In some embodiments, the velocity of the cement exiting at a center of the nozzle is within 10% of the velocity of the cement exiting at a position L/10 from the first or second end.

In some embodiments, the honeycomb body comprises a honeycomb structure with intersecting walls forming channels. The honeycomb body may be fabricated from a ceramic material. In some embodiments, the body is a ceramic honeycomb structure. In some embodiments, the body is a green honeycomb structure comprised of a ceramic-forming component. In some embodiments, the method further comprises removing a portion of the exterior of the body to expose the outer surface of the body prior to the cement being laid on the outer surface. In some embodiments, the body has first and second opposing end faces and a side surface that extends between the first and second faces, and the cement is applied to the side surface.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of applying a cement mixture to an exposed matrix of intersecting walls of a honeycomb body, the method comprising the steps of:
    providing an applicator including a flow distribution device with an inlet port and an elongated outlet port extending along an elongated axis and having a length L extending from a first end to a second end;
    feeding the cement mixture into the inlet port of the flow distribution device;
    forcing the cement mixture to exit the elongated outlet port, wherein the velocity of the cement exiting at a center of the applicator is less than the velocity of the cement exiting the applicator at a position L/10 from the first end or the second end of the elongated port; and
    depositing the cement mixture on the exposed matrix of the honeycomb body.

2. The method of claim 1 wherein the velocity of the cement exiting at the center of the applicator is within 50% of the velocity of the cement exiting at a position L/10 from the first or second end.

3. The method of claim 1 wherein the velocity of the cement exiting at a center of the applicator is within 25% of the velocity of the cement exiting at a position L/10 from the first or second end.

4. The method of claim 1 wherein the velocity of the cement exiting at a center of the applicator is within 10% of the velocity of the cement exiting at a position L/10 from the first or second end.

5. The method of claim 1, wherein the applicator is provided with a nozzle including an end surface elongated along a length of the nozzle, the end surface including an elongated outlet port extending along the length of the nozzle, wherein the end surface includes a transverse width from about 2.5 mm (about 0.1 inches) to about 6.35 cm (about 2.5 inches) along the length of the nozzle; and wherein the cement mixture is forced to exit the elongated outlet port of the nozzle.

6. The method of claim 5, wherein the end surface of the nozzle is concave in a direction facing the honeycomb body.

\* \* \* \* \*